United States Patent [19]

McFee

[11] Patent Number: 4,837,489

[45] Date of Patent: Jun. 6, 1989

[54] MAGNETOMETER-BASED LOCATOR AND IDENTIFIER FOR FERROUS OBJECTS HAVING UNKNOWN SHAPES

[75] Inventor: John E. McFee, Medicine Hat, Canada

[73] Assignee: Her Majesty the Queen in right of Canada, as represented by the Minister of National Defence, Ottawa, Canada

[21] Appl. No.: 102,379

[22] Filed: Sep. 29, 1987

[30] Foreign Application Priority Data

Apr. 24, 1987 [CA] Canada ................................. 535584

[51] Int. Cl.$^4$ ..................... G01R 19/00; G01R 33/12; G01V 3/08
[52] U.S. Cl. ..................... 324/67; 324/207; 324/226; 324/260; 324/326; 324/345; 340/710
[58] Field of Search ............. 324/66, 67, 207, 208, 324/234, 236, 240, 243, 226, 227, 244, 260, 262, 228, 253–255, 326–329, 345; 340/710

[56] References Cited

U.S. PATENT DOCUMENTS

| 3,238,448 | 3/1966 | Wood et al. | 324/220 |
| 4,464,622 | 8/1984 | Franklan | 324/67 |
| 4,527,123 | 7/1985 | Gilman et al. | 324/67 X |
| 4,538,476 | 9/1985 | Luque | 340/710 X |
| 4,672,321 | 6/1987 | Howell | 324/67 X |

FOREIGN PATENT DOCUMENTS 3600446 7/1987 Fed. Rep. of Germany ........ 324/67

OTHER PUBLICATIONS

Whitehead, "Metal Pipe or Wiring Locator", *Practical Electronics*, vol. 12, No. 12, pp. 952–955, Dec. 1976.

*Primary Examiner*—Reinhard J. Eisenzopf
*Assistant Examiner*—Warren S. Edmonds
*Attorney, Agent, or Firm*—Stevens, Davis, Miller & Mosher

[57] ABSTRACT

A ferrous object detector and locator includes a magnetometer sensor and a position sensor controlled by a microprocessor. The device accurately locates and identifies an unknown ferrous object and determines the depth and orientation of a buried ferrous rod. Simultaneous magnetic field measurements from the magnetometer and position information in one or more orthogonal directions from the position sensor are combined and analyzed by the microprocessor using predetermined algorithms to determine the location and identity of the object. The detecetor is capable of detecting location and identity of objects of general shape and size.

7 Claims, 6 Drawing Sheets 4,837,489

MAGNETOMETER-BASED LOCATOR AND IDENTIFIER FOR FERROUS OBJECTS HAVING UNKNOWN SHAPES

FIELD OF THE INVENTION

The present invention relates to an apparatus for detecting and locating ferrous objects, and more particularly relates to an apparatus for detecting and locating ferrous objects by means of a magnetometer.

BACKGROUND OF THE INVENTION

It is desirable to be able to determine the location (that is, the position coordinates relative to some space-fixed system) and classification or identity (that is, the characteristic radii, diameters, lengths, shape, dipole or higher order moment, etc.) of a ferrous object, given that the object type (magnetic dipole, sphere, spheroid, rod, pipe, rope, cable, etc.) is known and that magnetic and positional measurements must be made in a planar surface underneath or behind which the object is buried. By way of example, it is desirable to be able to determine the position in a plane, depth of burial, and inner and outer radii of a ferrous rod, rope, pipe or cable (hereafter referred to as a "rod") which is buried a constant depth beneath a planar surface, by making magnetic measurements on the planar surface, the term depth referring to the minimum distance from the rod axis to the plane. This capability is important in a number of applications:

a. The field identification of the various types of structural concrete members for demolition tasks. Since all tensile loads are carried by the imbedded steel, usually in the form of bars, rods, wire rope or cable, explosive demolition relies on weakening the steel or the sections of concrete where the steel is absent. Knowledge of the size, depth of burial, and orientation of the steel rods is therefore important for effecting successful demolition of the structure while using a minimum of explosive materials.

b. The location and identification of steel or iron conduits buried in floors and walls by the construction industry. Such information can save the costly dismantling of walls or floors by accurately locating a specific conduit.

c. The location and identification of steel or iron pipe bombs by police forces and the military. Such information can distinguish between a conduit and a bomb in a floor, wall or culvert, and give an estimate of the size of the bomb.

d. The location and determination of the radius of steel gas pipes by utility companies. Accurate location and identification can substantially reduce digging costs.

It is also desirable to be able to determine the location, including depth of burial and magnetic dipole moment components, of a static magnetic dipole which is buried beneath a planar surface, by making magnetic measurements on the planar surface. This problem arises in a number of applications where the object of interest is composed of ferrous material and measurement is made at distances of at least a few times a characteristic dimension of the object; for example:

a. Detecting small ferrous objects imbedded in a human body. Bullets, steel slivers or other ferrous fragments are often difficult to locate if ingested or otherwise imbedded in the body. Such objects normally are small enough that they can be considered magnetic dipoles if magnetic measurements are made a few centimeters above the area of interest.

b. Detecting the location and estimating the size of a ferrous object during archaeological investigations, without disturbing the object or the surrounding environment.

c. Detecting handguns in baggage or on persons, by estimating the amount of steel present.

It is also desirable to be able to determine the location and radius of a sphere or location and length of major and minor axes of a ferrous spheroid buried beneath a planar surface, by making magnetic measurements on the planar surface. This problem can arise in a number of applications, most notably in the detection of foreign ferrous bodies of such shape in the human body, and in the detection of small ferrous explosive objects under floors or behind walls.

A number of detectors are available which measure small magnetic fields with sufficient sensitivity to detect ferrous rod, magnetic dipoles, ferrous spheres, spheroids, etc. of sizes and depths of burial typical of the applications mentioned above. Such detectors are called magnetometers, and their output signals or values are a function of both relative sensor-to-object distance and object size, shape and orientation. These components of the magnetometer output cannot readily be separated, since it is necessary to obtain sensor position information, in addition to the magnetic information, in order to be able to separate the components. Currently available magnetometers do not have the ability to collect sensor position and magnetic data and analyse the data with a microprocessor or computer in realtime, and thus no detector is capable of directly yielding the position coordinates and size and shape parameters.

SUMMARY OF THE INVENTION

The present invention relates to a ferrous object locator comprising a magnetometer to measure the magnetic field of a ferrous object and a position sensor to measure the displacement of the magnetometer in one or more orthogonal directions, in a plane of measurement behind or beneath which the ferrous object is located, the data from the magnetometer and position sensor being analyzed by means of a microprocessor to locate and identify the ferrous object.

More particularly, the present invention relates to a ferrous object locator, comprising: magnetic sensing means for measuring a magnetic field from a ferrous object; position sensing means for measuring the displacement from an initial position of the magnetic sensing means in one or more orthogonal directions, in a plane of measurement behind or beneath which the ferrous object is located; and processing means for receiving data from the magnetic sensing means and the position sensing means and deriving from the data, information about the location and identification of the ferrous object.

BRIEF DESCRIPTION OF THE DRAWINGS

A preferred embodiment of the presnet invention will now be described in conjunction with the attached drawings, in which.

DETAILED DESCRIPTION OF A PREFERRED EMBODIMENT

Figure 1:
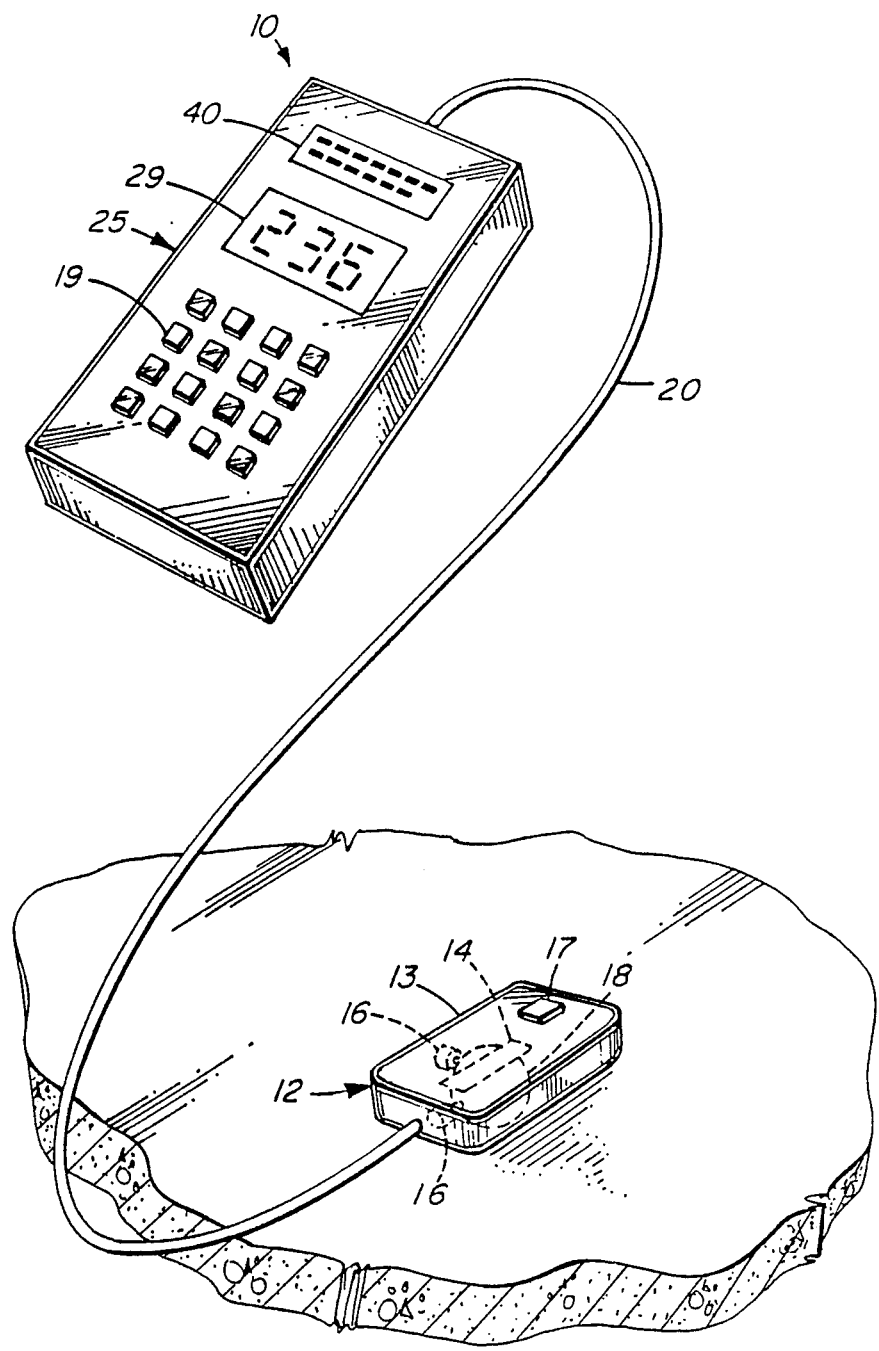
FIG. 1 depicts a locator of the present invention.

A preferred embodiment of the locator of the present invention is shown generally as 10 in FIG. 1. Locator 10 comprises two units 12 and 25, described below, which are connected by a flexible cable 20 for transmitting electrical signals therebetween.

A first unit 12 of locator 10 comprises a sensor housing 13 which contains a magnetometer 14 and a position sensor 16 to measure the displacement of housing 13 in one or two orthogonal directions. A control button 17 sets the initial position coordinates, for use with the algorithms, and can remotely initiate various functions of a microprocessor, as will herewith be described. Magnetometer 14 may be either a vector magnetometer, which measures a component of the magnetic field, or a total field magnetometer, which measures the magnitude of the field but not its direction. Numerous designs and manufacturers of such sensors are known to persons skilled in the art, and one such magnetometer will be described in detail below. Position sensor 16 may be any of a number of designs based on a rotating wheel or ball and measuring the motion of markings, bumps, pits or other indicators on the wheel or ball, or on a shaft connected to or contacting the wheel or ball. For small self-contained units, a preferred design is one that is similar to the position sensor found in a computer "mouse". Typically, the computer mouse position sensor consists of a track ball which rotates as it rolls along a measurement surface when the sensor housing is moved; in the present embodiment, a track ball 18 is used in such a configuration. Two shafts (not herewith depicted) whose axes are orthogonal, each coupled to an optical incremental shaft encoder, rotate as ball 18 rotates about their respective axes. Each shaft encoder has two voltage outputs. The output of each shaft encoder is a pulse train, that is, a digital signal which alternates between two voltage levels. The spacing between two voltage transitions corresponds to the shaft having rotated by a predetermined fixed amount, or, equivalently, the sensor having moved a fixed distance in that direction. The relative phase of the two voltage outputs for each encoder allows a determination to be made of whether displacements in the corresponding direction are positive or negative. A simpler design, not herewith illustrated, consists of a wheel which rotates on the measurement surface; the wheel is connected to a single shaft with one optical incremental encoder and gives positive and negative displacement information in only one direction.

Figure 2:
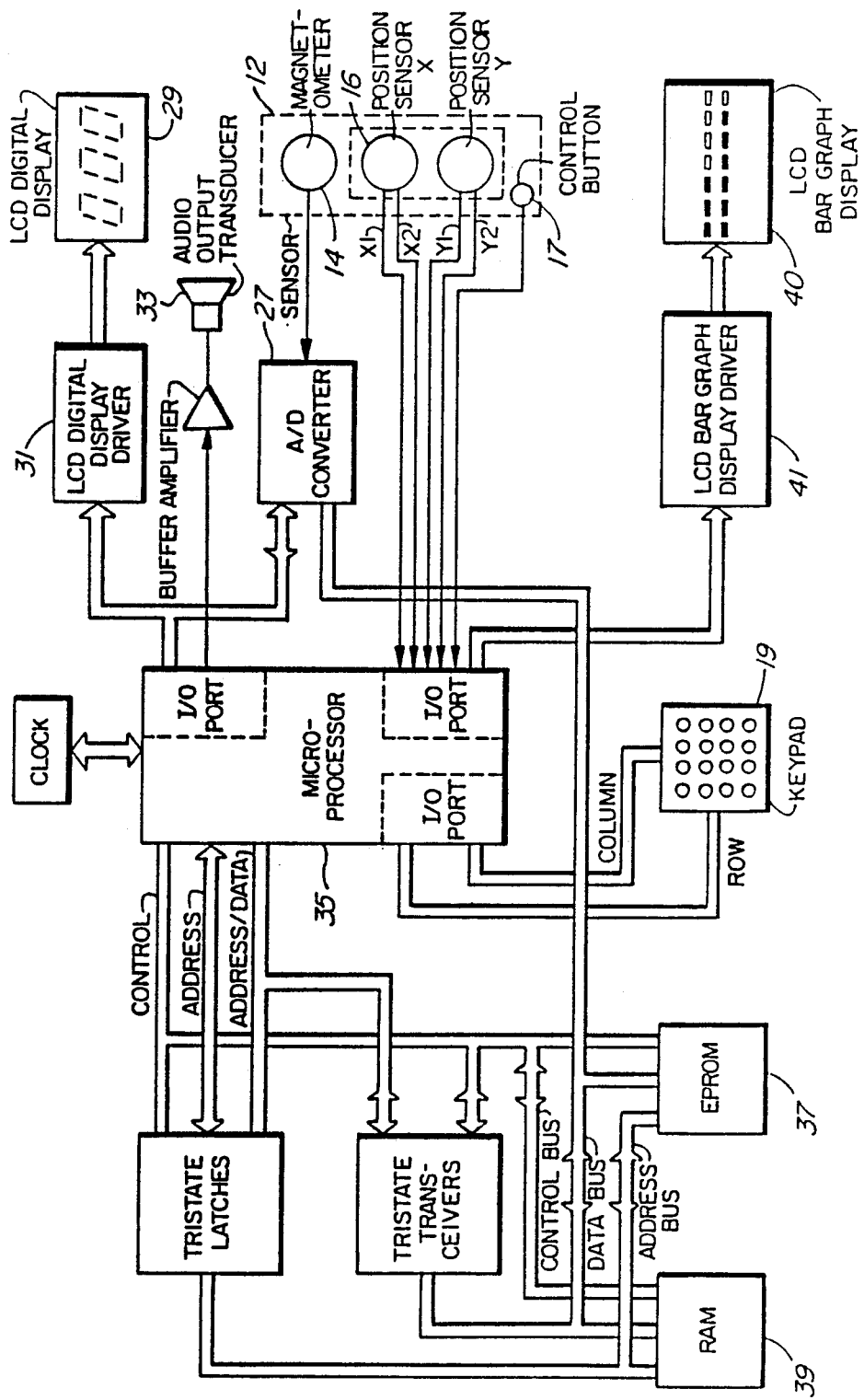
FIG. 2 is a schematic circuit diagram of the microprocessor and display unit of the locator of FIG. 1.

A second unit 25 of locator 10 is a microprocessor and display unit having output displays 29 and 40 and input keys 19. Pushbuttons 19 control the different microprocessor functions such as data collection, calculation of object size, and depth and orientation. (Pushbuttons 19 can be omitted in simpler versions of locator 10, where only one type of article, for example, a rod, is the object of the search; in such a device, all the control functions can be carried out using button 17 of unit 12). Microprocessor and display unit 25 also contains signal processing electronics, an analog to digital (A/D) converter 27, output display 29 and display electronics 31 and 41, an audio output transducer 33 (such as a speaker or headphone), and a microprocessor 35; a schematic diagram, which represents an embodiment based on an 8-bit microprocessor, is shown in FIG. 2.

Figure 3:
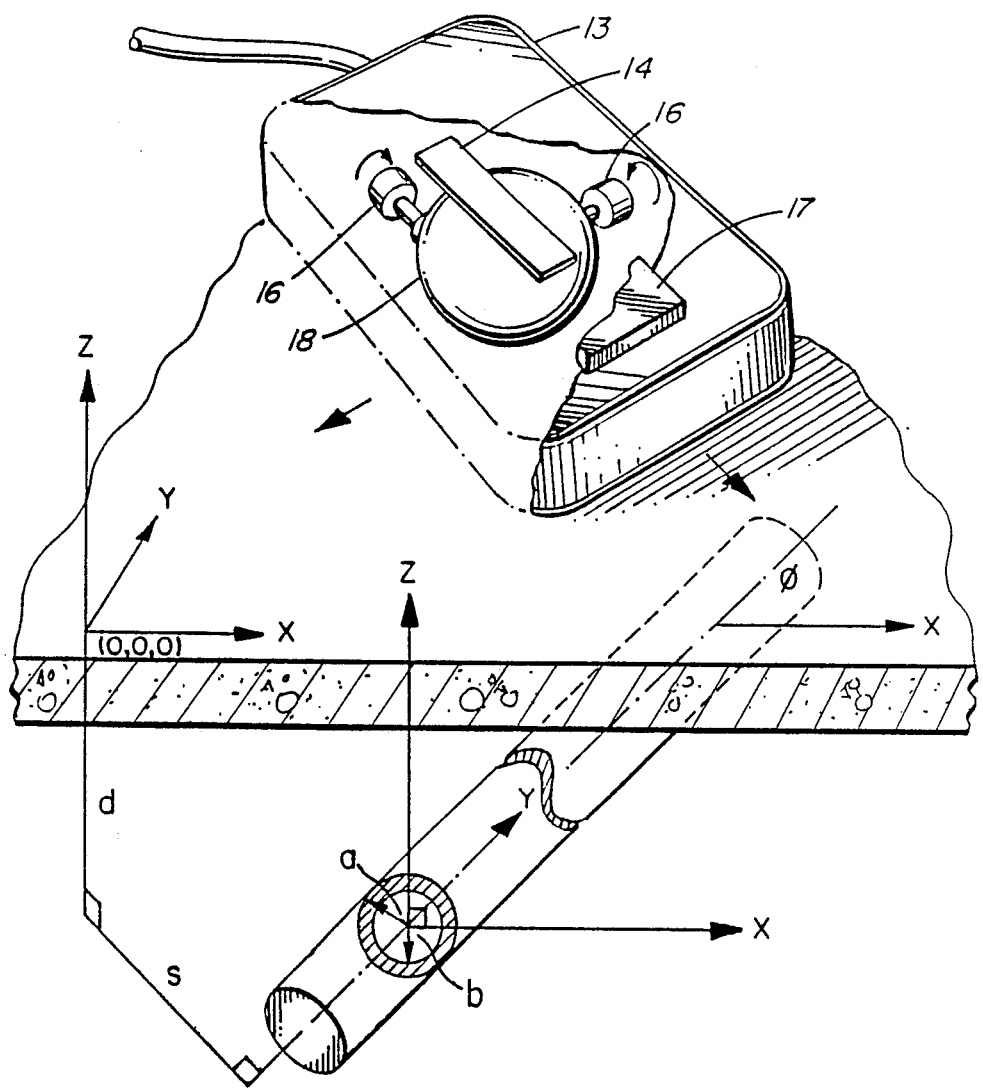
FIG. 3 depicts the sensor housing, for the locator of FIG. 1, relative to a buried ferrous object.
Figure 4:
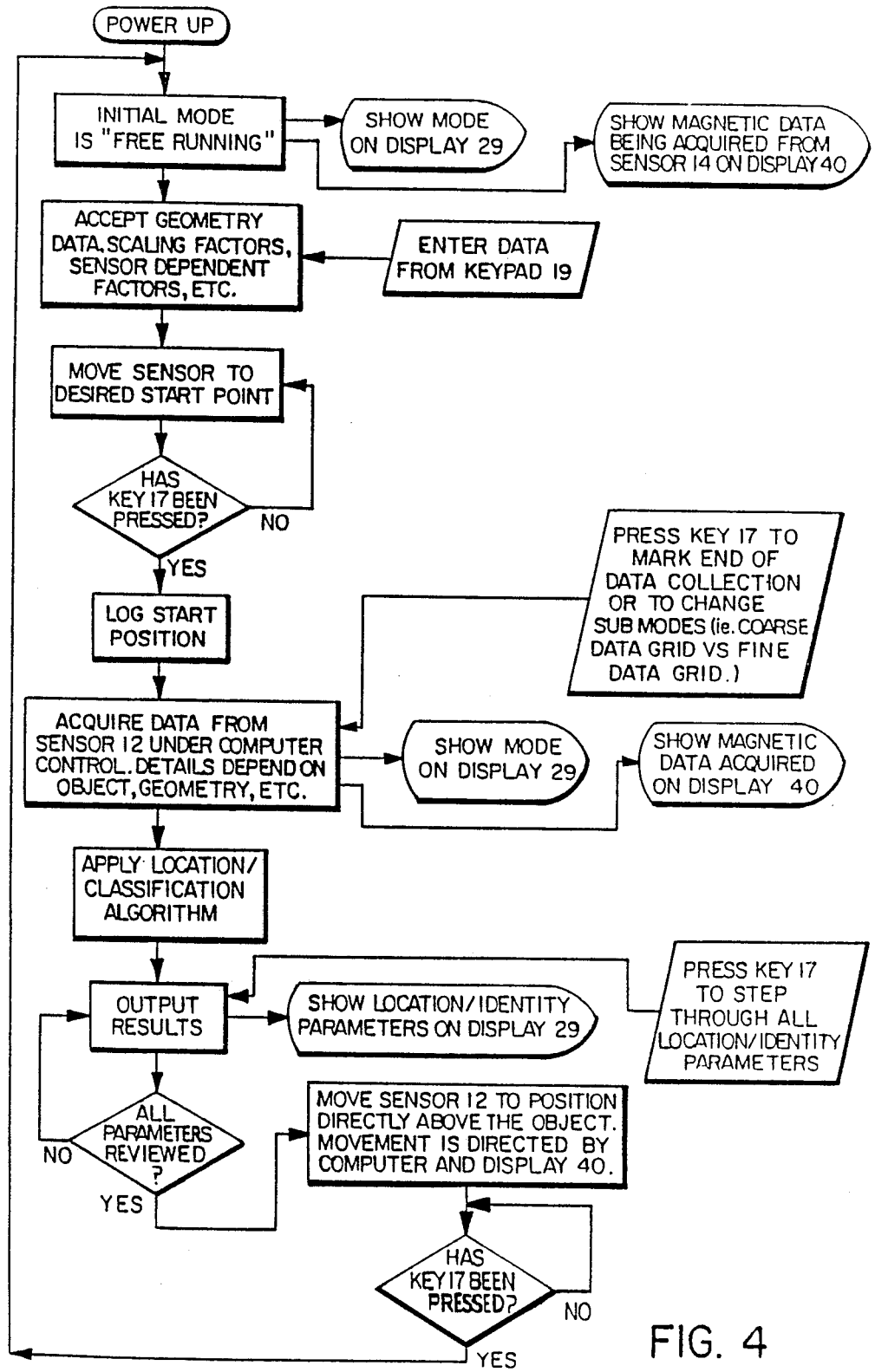
FIG. 4 is a flowchart for the operation of the locator of FIG. 1, for location identification of a general object.

In operation, magnetometer 14 and position sensor 16 provide magnetic field values with the corresponding position coordinates in the plane of measurement as sensor housing 13 is moved about on the surface under which the ferrous object is buried, as shown in FIG. 3. The magnetometer signal is an analog signal which is digitized by A/D converter 27. The position coordinate signals are, as described above, digital pulse trains which are read by a parallel input/output (I/O) port of microprocessor 35. Microprocessor 35 controls the digitization of magnetic field values and the storage of the magnetic field values. It also controls the counting and phase measurement of the position encoder pulse trains and converts that information to two dimensional position coordinates, informs the operator of the required steps, and controls execution of the algorithms utilized to calculate the position coordinates and orientation size and shape parameters of the ferrous object from the data. A flowchart showing the operation of locator 10, for location and identification of a general object, is shown in FIG. 4. The algorithms and control program can be stored as an EPROM (Erasable Programmable Read Only Memory) 37, which may be changed depending on the ferrous object to be located, and the data can be stored in a RAM (Random Access Memory) 39. Magnetic field values may be displayed on display 40 as a bar graph whose length increases with increasing field value, as shown in FIG. 1, a digital number on liquid crystal display 29, also depicted in FIG. 1, an audio tone which increases in frequency as the field values increase, or by any other convenient means. As seen from FIG. 2, display drivers 31 and 41 and the audio output of transducer 33 are controlled by the parallel output ports of microprocessor 35.

Embodiments employing different microprocessor systems, such as 16 bit systems, or numeric coprocessors, or different position or magnetic sensors or displays, are straightforward extensions of the above system.

Figure 5:
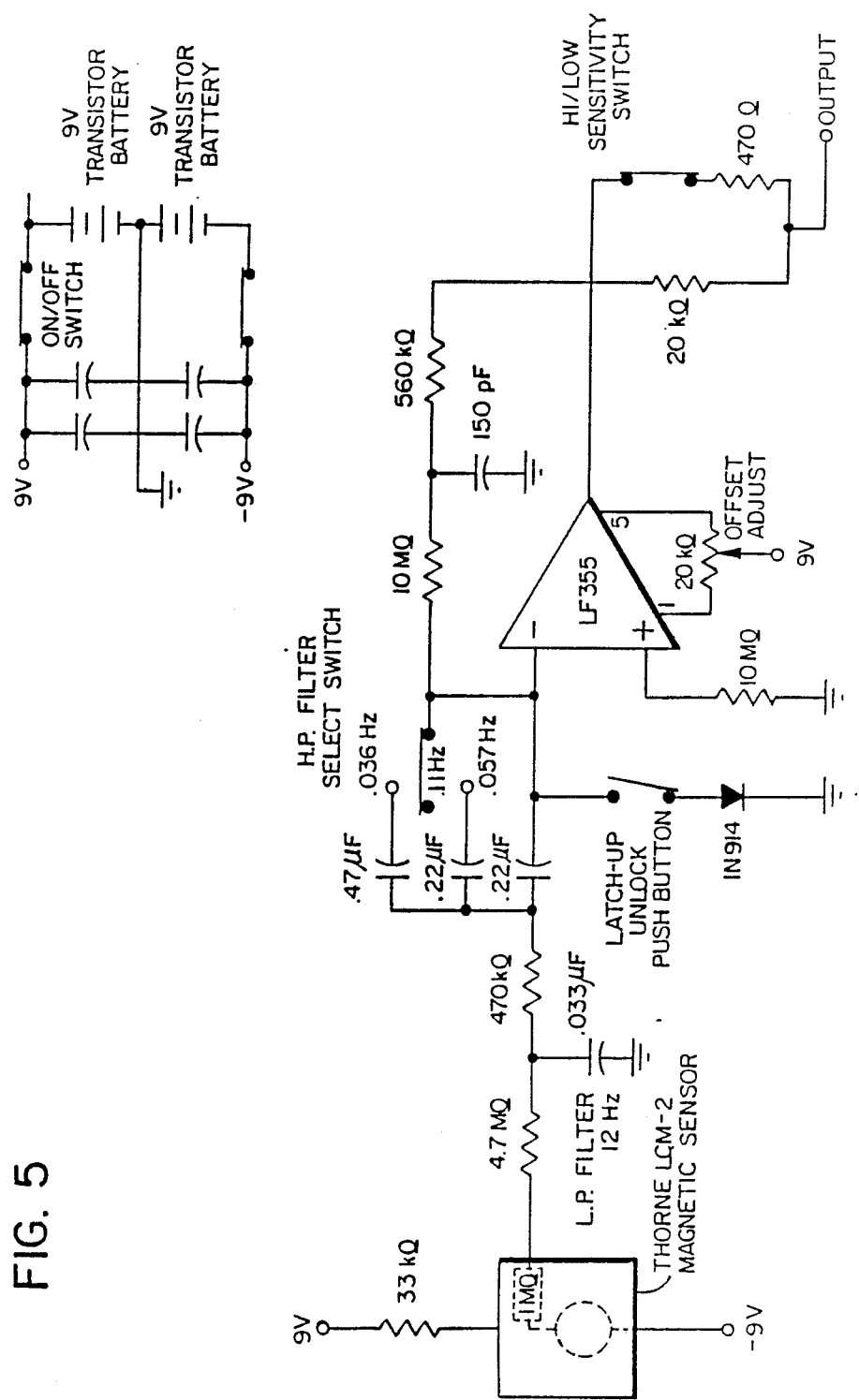
FIG. 5 is a schematic circuit diagram for the sensor of the present invention.

A suitable and commercially available sensor which can employed in the embodiment herewith described is the Thorne LCM-2 fluxgate magnetometer. This sensor is appropriate because it has self-contained drive circuitry and a built-in peak detector, all of which can conveniently be housed in a compact (30 mm×20 mm×15 mm) and sturdy package. The Thorne magnetometer is capable of operating at temperatures ranging from −40 degrees to +60 degrees Celsius. It has a nominal minimum sensitivity of 100 nanoTeslas (nT) for a 0.01 Hz to 10 Hz bandwidth if used with the detection circuit suggested by the manufacturer. For the instant application, the circuit can be modified to enable the use of the widely available LF355 operational amplifier, which has the advantages of low noise, low drift and low cost. This circuit, the schematic of which is depicted in FIG. 5, is essentially a combination voltage amplifier and bandpass filter. A lower frequency cutoff of either nominally 0.036 Hz, 0.057 Hz or 0.11 Hz may be selected to reject low frequency components of the ambient field. This is necessary since the ambient field completely obscures the field due to the objects of interest if dc measurements are made. Since different sensor speeds are desirable for different applications, different low frequency cutoffs are ncessary. One of two output sensitivities may be selected as well. The sensor and circuit can be powered by two nine-volt transistor radio batteries.

The detection circuit illustrated in FIG. 5 satisfies the following criteria:

a. The circuit input impedance is greater than 5 Mohms. This is necessary due to the 1 Mohm output impedance of the sensor.

b. The nominal circuit pass band is 0.036, 0.057 or 0.11 Hz to 12 Hz. Although the bandwidth of the sensor is dc to 15 Hz, there is little information of interest, in the instant application, above 12 Hz. As noted above, the sensor and circuit must be ac coupled.

c. The circuit has an output impedance low enough to drive a low impedance measuring device such as an analog meter.

d. Circuit amplification is adequate to take advantage of available sensor sensitivity (9.4 mV/1000 nT±10%).

Other magnetometers, such as the regular, low-power, or ultra-low power magnetometers in the BROWN series, can be employed to give a nominal sensitivity of less than 1 nT, over the same temperature range and frequency bandwidth, if more sensitive measurements are required.

Microprocessor 35 analyses the magnetic and position data which it acquires in different ways, depending on the kind of ferrous object for which the search is being undertaken. Analysis for a rod (solid or hollow), a magnetic dipole, a sphere and a spheroid are herewith presented as examples. All the ferrous objects are assumed to be uniformly permeable and to have no permanent magnetization. The extension to other ferrous objects is straightforward if the magnetic field equations are known.

ANALYSIS TO LOCATE AND CLASSIFY A LONG FERROUS ROD GEOMETRY AND GENERAL METHOD: VECTOR MAGNETOMETER

Define a cartesian coordinate system x, y, z and assume that a ferrous rod or pipe of outer radius, a, inner radius, b, and relative magnetic permeability $\mu$ (typically >50), is buried at constant depth (z=d) under a planar surface (on which the measurements are made) which is orthogonal to the z-axis (see FIG. 3). (The terms "under" and "depth" herewith refer to direction along the z-axis.) The rod is assumed to have no permanent magnetization, to hvae a length much greater than its radius or depth, and to have its axis of symmetry parallel to the y axis. The medium in which the rod is imbedded is assumed to have $\mu=1$. We assume that the magnetometer is a vector magnetometer which measures the z component of the magnetic field, $B_z+B_{oz}$, along the surface, where $B_z$ is due to the rod and $B_{oz}$ is due to the ambient field of the earth. The earth's field may be assumed for these calculations to be spatially and temporally constant. Measurements are made far from either end of the rod and the rod axis is the line defined by x=0, z=0. The Laplace equation with appropriate boundary conditions may be solved to yield:

$$B_z = \frac{G(B_{oz}[d^2 - x^2] + 2B_{ox} \times d)}{x^2 + d^2} \quad (1)$$

where $$G = a^2 \left[ \mu \left( \frac{a^2}{b^2} - 1 \right) - \left( \frac{a^2}{b^2} + 1 \right) \right] /$$

$$\left[ \mu \left( \frac{a^2}{b^2} - 1 \right) + \left( \frac{a^2}{b^2} + 1 \right) \right]$$

$$G = a^2 \frac{(\mu - 1)}{(\mu + 1)} \text{ for a solid rod} \quad (2)$$

$G \approx a^2$ (to within ±4%) for a rod wehre $\mu > 50$ and the components of the ambient magnetic field, $B_o$, are given by $B_{ox}, B_{oy}, B_{oz}$, ($B_o^2 = B_{ox}^2 + B_{oy}^2 + B_{oz}^2$).

Simultaneous magnetic field and position measurements are made on the measurement surface relative to a space-fixed cartesian coordinate system (X, Y, Z) with arbitrary origin (0, 0, 0) somewhere in the plane of measurement. The system is chosen so that $$\begin{pmatrix} x \\ y \\ z \end{pmatrix} = \begin{pmatrix} \cos\phi & \sin\phi & o \\ -\sin\phi & \cos\phi & o \\ o & o & 1 \end{pmatrix} \begin{pmatrix} X - s\sin\phi \\ Y + s\sin\phi \\ Z - d \end{pmatrix} \quad (3)$$

where s is the minimum distance in the plane from the space fixed origin to the rod axis and $\phi$ is the angle in the plane between the rod axis and the X axis.

The ambient field components can be measured far from the rod and thus, for $\mu<50$, there are only six unknown variables, namely d, s, $\phi$, a, b and $\mu$ (five if the rod is solid and four if $\mu>50$). In principle, then, only six (or five if the rod is solid or four if $\mu>50$) independent magnetic field measurements and simultaneous position measurements are needed to solve for the unknown quantities. Generally, an iterative method of solution is required, since Equations (1) and (2) are nonlinear. A relatively fast microprocessor with numeric coprocessor is suitable for this task, in which case a few additional sets of measurements may be desirable to improve stability and convergence of solution.

SIMPLIFIED APPROXIMATION METHOD

In many cases, approximations yield very simple equations which relatively cheaper, slower and simpler microprocessors can solve noniteratively.

As an example, assume that a solid rod is horizontal at a mid-latitude location. Then $B_{oz} \approx 57,000$ nT and $\alpha = -B_{ox}/B_{oz}$ varies from 0 to 0.306 as the angle between the rod axis and the north—south direction varies from 0 to 90 degrees. It is seen from Equation (1) that if $\alpha<1$ then, to a first order approximation, the maximum measured field occurs at:

$$x_m = \frac{\alpha}{3} d \quad (4)$$

The full width at half maximum is given by $$\Delta X_{1/2} = 2\gamma d + \delta \quad (5)$$

where $$\gamma = (\sqrt{5} - 2)^{\frac{1}{2}} \approx 0.4859 \quad (6)$$

$$\delta = \frac{d}{2} \left\{ \left( \frac{\beta\gamma^4 + (2\beta + 1)\gamma^2 - 2\alpha\gamma + \beta - 1}{\alpha - (2\beta + 1)\gamma - 2\beta\gamma^3} \right) - \right. \quad (7)$$

$$\left. \left( \frac{\beta\gamma^4 + (2\beta + 1)\gamma^2 + 2\alpha\gamma + \beta - 1}{\alpha + (2\beta + 1)\gamma + 2\beta\gamma^3} \right) \right\}$$

$$\beta = \frac{1}{2} \left( 1 + \frac{5}{9} \alpha^2 \right) / \left( 1 + \frac{\alpha^2}{9} \right)^2 \quad (8)$$

Figure 6:
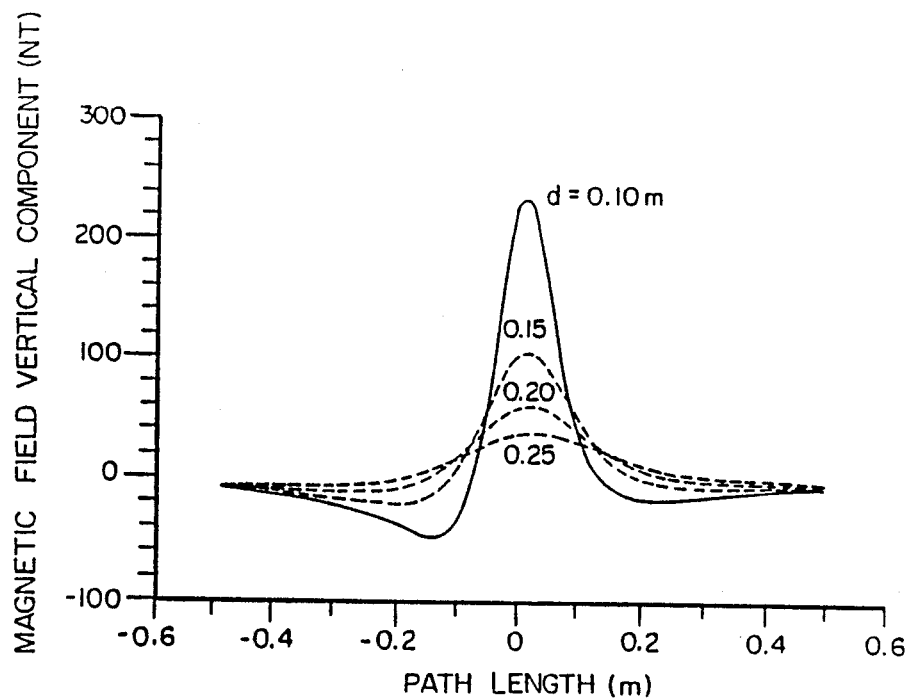
FIG. 6 depicts the calculated magnetic profiles of a reinforcing rod buried at varying depths from the sensor of the present invention.
Figure 7:
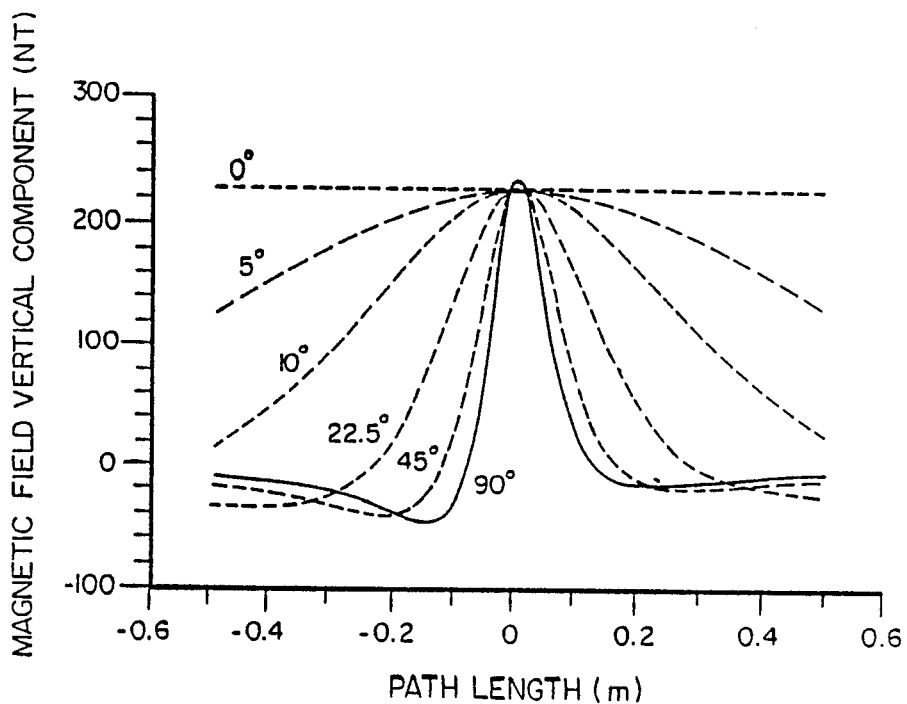
FIG. 7 depicts the calculated magnetic profiles of a reinforcing rod, buried at a fixed depth from the sensor of the present invention, for various orientations of the path of the sensor.

The radius of the rod is given by $$a = d \sqrt{\frac{B_{zmax}}{B_{oz}}} \frac{1}{\sqrt{2\beta}} \quad (9)$$

where $B_{z\,max}$ is the maximum measured field in the z direction above baseline. A review of these equations shows that the profiles are insensitive to rotations of the rod in a horizontal plane. For $\alpha=0$ (horizontal rod oriented north-south) the field maximum occurs at $x=0$ (i.e., directly over the center of the rod) and the full width at half maximum (FWHM) is approximately 0.972 d. For $\alpha=0.306$ (horizontal rod oriented east-west) the maximum occurs at $x=0.1$ z and the FWHM is approximately 1.027 d. The rod radius estimate for the $\alpha=0.306$ case is only 1.5% less than the $\alpha=0$ case. These points are illustrated in FIGS. 6 and 7. FIG. 6 depicts the calculated magnetic profiles perpendicular to the axis of a horizontal number 4 reinforcing rod (nominal radius 6.35 mm) at various depths. FIG. 7 depicts the calculated profiles obtained for various orientations of the path of sensor 14 with respect to the rod axis in a horizontal plane at a fixed rod depth of 0.10 m. It is seen that the minimum width occurs for a profile perpendicular to the rod direction and broadens as the traverse direction is rotated toward the rod direction. The peak magnetic field is seen to be a function of rod depth but is approximately independent of rod orientation.

Thus a simplified method for determination of depth, rod orientation in the plane of measurement, minimum distance to origin and rod radius is as follows:

a. Move magnetometer 14 in a plane to find one field maximum.

b. Find the field maximum at another location on the plane.

c. The line joining the two points is the projection of the axis of the rod on the measurement plane. This determines s and $\phi$.

d. Move magnetometer 14 in a direction perpendicular to the axis direction and measure the FWHM. The depth, d, is equal to the FWHM (maximum error approximately 3%) and Equation (9) yields the rod radius.

The above method requires only a one-dimensional (X coordinate) position sensor which moves in a straight line. If a two-dimensional (X, Y coordinates) position sensor is available, the rod parameters may be determined with less sensor motion but at the expense of a more complicated position sensor and slightly more complex algorithm, as follows:

a. Move magnetometer 14 in a straight line in the plane to find a magnetic field maximum. Microprocessor 35 records the maximum at $X=0$, $Y=0$ and the direction of sensor motion as the X axis. The FWHM along the X axis is also recorded.

b. Displace magnetometer 14 and find a second maximum. The microprocessor records these coordinates as $(X_m, Y_m)$.

c. The angle of orientation $\phi$ is equal to $\text{Tan}^{-1}(Y_m/X_m)$ and s is of course zero. This fixes the rod in the plane.

d. The depth of the rod is given by $d = \text{FWHM} \cdot \text{Sin}\phi$.

e. The rod radius is again obtained from Equation (9).

For vertical rods, profiles for a component parallel to the north-south direction in a plane perpendicular to that direction are very similar in shape to those discussed previously but are approximately 30% smaller in magnitude. Thus analysis of magnetic and position data to yield depth, orientation and radius of rod proceeds in the same manner as the approximation method just outlined. If the measurement plane is perpendicular to the east-west direction, the field vanishes. Thus, vertical rods will be generally more difficult to detect than horizontal ones.

Nevertheless, even if no approximations can be made, the iterative solution of Equations (1), (2), (3) will yield rod depth, orientation and radius.

ANALYSIS - TOTAL FIELD MAGNETOMETER

For a total field magnetometer, the magnetometer measures a field value $B_T$.

$$B_T^2 - B_o^2 = \frac{C_1 + C_2(x^2 - d^2) + C_3 \times d}{(x^2 + d^2)^2} \quad (10)$$

where $$\begin{aligned} C_1 &= G^2(B_{oz}^2 + B_{ox}^2) \\ C_2 &= -2G(B_{oz}^2 - B_{ox}^2) \\ C_3 &= 8GB_{ox}B_{oz} \end{aligned} \quad (11)$$

Again there are only six unknowns, d, s, $\phi$, a, b and $\mu$, and Equations (10) and (11) may be solved iteratively as for the vector magnetometer, using at least six independent magnetic field measurements and simultaneous position measurements as input.

In some cases approximations may be used to yield noniterative solutions, but it is important to note that, given at least six (five for a solid rod, four if $\mu>50$) independent sets of magnetic field and position coordinates, the rod location and radius may be determined.

ANALYSIS TO LOCATE AND CLASSIFY A MAGNETIC DIPOLE

Assume a space-fixed cartesian coordinate system (X, Y, Z) as in the analysis of the rod shown in FIG. 3. The geometry is the same as for the analysis of the rod except that the rod is replaced with a magnetic dipole situated at coordinates $(X_o, Y_o, Z_o)$. As before, the earth's field may be assumed to be spatially and temporally constant. In the presence of a magnetic dipole, the static magnetic field vector at any point will be a vector sum of the field due to the earth, $\vec{B}_o=(B_{ox}, B_{oy}, B_{oz})$, and the field due to the dipole, $\vec{B}=(B_x, B_y, B_z)$.

Vector magnetometers measure a component of the magnetic field, such as $B_z+B_{oz}$. Total field magnetometers measure the magnitude of the vector sum of the field of the dipoles and the earth, given by:

$$B_T^2 = B_o^2 + B^2 + 2\vec{B}\cdot\vec{B}_o \quad (12)$$

where $B_T$ is the magnetometer output value.

The magnetostatic field vector, $\vec{B}$, at position $\vec{R}=(X, Y, Z)$ of a magnetic dipole located at position $\vec{R}_o=(X_o, Y_o, Z_o)$, is given by the familiar expression:

$$B = \frac{\mu_o}{4\pi} r^{-3} [-\vec{M} + 3r^{-2}(\vec{M} \cdot \vec{r})\vec{r}] \tag{13}$$

where $\mu_o = 4\pi \times 10^{-7}$ H/m is the permeability of free space $$\vec{r} = \vec{R} - \vec{R}_o$$

$\vec{M} = (M_x, M_y, M_z)$ is the magnetic dipole moment. It is again assumed that measurements are made in the $Z=0$ plane.

There are now six unknown parameters, being the three components of $\vec{M}$ and the three components of $\vec{R}_o$, and hence at least six independent sets of measurements must be used. Known iterative and noniterative methods of solution may be incorporated into the microprocessor program.

ANALYSIS TO LOCATE AND CLASSIFY OTHER COMPACT FERROUS BODIES

The geometry and analysis are the same as for the dipole except that the vector $\vec{R}_o$ now defines the geometric center of the object and $\vec{B}$ is the magnetic field vector due to the object. Equation (13) is replaced by the field equation appropriate to the object. The field equations which replace Equation (13) for spheres and spheroids of uniform permeability with no permanent magnetization are known to persons skilled in the art, as are the field equations for certain other specialized objects. Generally, there will be 3+n unknown parameters, n being a small positive nonzero integer, and hence at least 3+n independent measurements are required for a solution of the parameters. For example, for the sphere, n=1 (radius), whereas for the spheroid, n=2 (major radius, minor radius) provided that the earth's field is known and that the ratio of relative permeability of the object to that of the imbedding medium is either known or exceeds 50, as is usually the case. Iterative solution methods are generally required. If measurements are made at distances of a few times a characteristic dimension of the object, the magnetic field behaves like that of a static magnetic dipole located at the geometric center of the object. In such a case, which often occurs in practice, the location and dipole moment can be determined as explained above. The object can then be classified by using the dipole moment as a feature vector and applying a pattern classifier algorithm; standard such algorithms have been described in the literature and are known to persons skilled in the art.

The locator described above is thus seen to have a number of advantages over existing detection devices:

a. Magnetic and positional information in two dimensions in a plane may be obtained and saved simultaneously.

b. Determination of depth (minimum of perpendicular distance of symmetry axis to a plane on which measurements are made) of a long ferrous rod beneath the plane of measurement may be accomplished in realtime.

c. Determination of the outer and inner radii of a long ferrous rod may be accomplished in realtime by measurement of magnetic field values and position coordinates in a plane of measurement.

d. Determination of the position in a plane of measurement of a ferrous rod may be accomplished in realtime by measurement of magnetic field values and position coordinates in the plane of measurement.

e. Determination of location (position coordinates) and magnetic dipole moment components of a buried magnetic dipole may be accomplished by measurement of magnetic field values and position coordinates in a plane of measurement.

f. Determination of the location (position co-ordinates) and identification of a buried compact ferrous object can be accomplished by the measurement of magnetic field values and coordinates in a plane of measurement.

g. Reconfiguration of the locator of the present invention, to locate ferrous rod or magnetic dipoles or other ferrous objects, can be made merely by changing or reprogramming the EPROM in the device.

h. Replacement or reprogramming of the EPROM's enables the locator of the present invention to be used to distinguish between different types of ferrous objects, such as spheres or rods, by comparing measured and stored patterns of magnetic and positional data obtained on a planar surface of measurement.

The foregoing has shown and described a particular embodiment of the invention, and variations thereof will be obvious to one skilled in the art. Accordingly, the embodiment is to be taken as illustrative rather than limitative, and the true scope of the invention is as set out in the appended claims.

The embodiments of the invention in which an exclusive property or privilege is claimed are defined as follows:

1. A ferrous object locator, comprising:
   magnetic sensing means for measuring a magnetic field from a ferrous object, said magnetic sensing means comprising a magnetometer;
   position sensing means for measuring the displacement from an initial position of said magnetic sensing means in one or more orthogonal directions in a plane of measurement behind or beneath which said ferrous object is located; and
   microprocessor means for receiving data from said magnetic sensing means and said position sensing means and deriving from said data, information about the location and identification of said ferrous object, wherein said microprocessor means compares said data from said magnetic sensing means and from said position sensing means with magnetic data or magnetic and positional data stored in a data storage means.

2. The ferrous object locator of claim 1, further comprising display means for displaying said information about the location and identification of said ferrous object.

3. The ferrous object locator of claim 1, wherein said data storage means comprises an Erasable Programmable Read Only Memory (EPROM).

4. The ferrous object locator of claim 1, wherein said magnetic sensing means is placed within a housing and said position sensing means comprises a tracking ball in said housing, said tracking ball being in contact with the surface of said plane of measurement and capable of rotating as said housing is moved along said plane of measurement, and a pair of orthogonal sensing means, the output of each of said orthogonal sensing means providing an indication of displacement in the corresponding orthogonal direction.

5. The ferrous object locator of claim 1, wherein said magnetic sensing means is placed within a housing and said position sensing means comprises a rotating wheel in said housing, said rotating wheel being in contact with the surface of said plane of measurement and capable of rotating as said housing is moved along said plane of measurement, and displacement sensing means, the output of said displacement sensing means providing an indication of displacement in a direction of said plane of measurement.

6. The ferrous object locator of claim 2, wherein said display means comprises an audio output transducer.

7. The ferrous object locator of claim 2, wherein said display means comprises a liquid crystal digital display.

* * * * *